United States Patent [19]

Clark

[11] Patent Number: 5,839,554
[45] Date of Patent: Nov. 24, 1998

[54] POWER COLLECTOR FOR INDUCTIVE POWER TRANSFER

[75] Inventor: Peter Bruce Clark, Warkworth, New Zealand

[73] Assignee: Auckland UniServices Limited, Auckland, New Zealand

[21] Appl. No.: 545,723

[22] PCT Filed: May 3, 1993

[86] PCT No.: PCT/NZ93/00030

§ 371 Date: Nov. 2, 1995

§ 102(e) Date: Nov. 2, 1995

[87] PCT Pub. No.: WO94/25304

PCT Pub. Date: Nov. 10, 1994

[51] Int. Cl.$^6$ .................................................. B60L 9/00
[52] U.S. Cl. ........................................................ 191/10
[58] Field of Search .................................. 191/2, 3, 4, 5, 191/6, 7, 10, 14–21; 246/187 R, 187 A, 187 B; 320/2, 21

[56] References Cited

U.S. PATENT DOCUMENTS

| 3,914,562 | 10/1975 | Bolger | 191/4 X |
|---|---|---|---|
| 4,007,817 | 2/1977 | Bolger, Jr. | 191/14 X |
| 4,800,328 | 1/1989 | Bolger et al. | 191/4 X |
| 5,311,973 | 5/1994 | Tseng et al. | 191/10 |
| 5,431,264 | 7/1995 | Tseng et al. | 191/10 |

FOREIGN PATENT DOCUMENTS

| 4115568 | 2/1993 | Germany | 191/10 |
|---|---|---|---|
| 1418128 | 12/1975 | United Kingdom | |
| 92/17929 | 10/1992 | WIPO | |

*Primary Examiner*—S. Joseph Morano
*Attorney, Agent, or Firm*—Young & Thompson

[57] ABSTRACT

This inductive power transfer system provides a capacitor (15) having a pickup coil (14) in series between the windings of the pickup coil and the electrical load (16, 17, 18). A power-factor compensating capacitor (19) may be used at the feed to a loop of one or a few turns of primary inductor cable (11,12), so that a reasonable supply-mains current can maintain the primary inductor current. The length of the cable, and hence the impedance, of primary cable may be varied in order to match the primary inductor to the voltage of the supply mains.

10 Claims, 4 Drawing Sheets

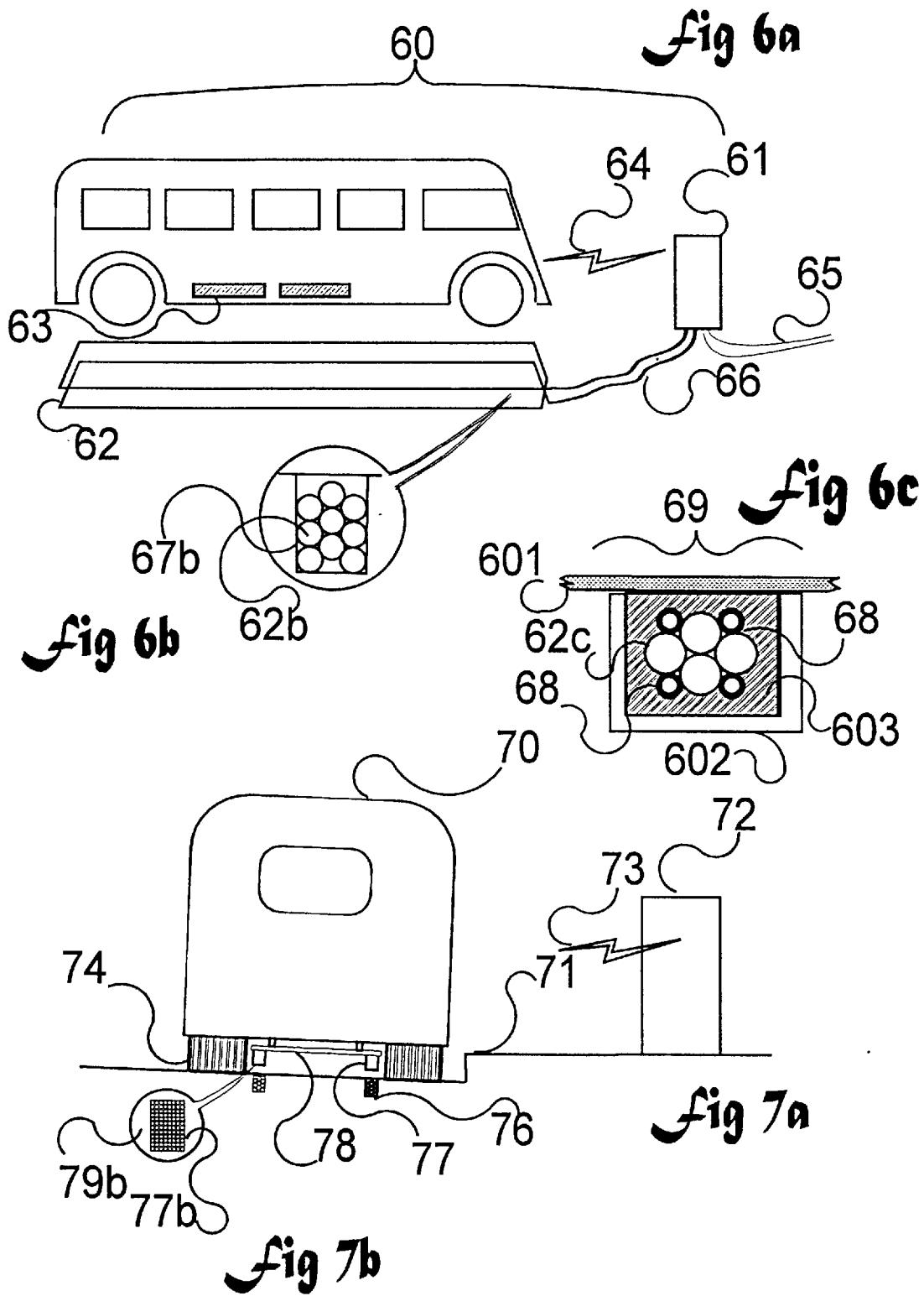

POWER COLLECTOR FOR INDUCTIVE POWER TRANSFER

TECHNICAL FIELD OF THE INVENTION

This invention relates to a system for inductive transfer of power across a gap, useful in the provision of electric power to one or more mobile consumers of electric power. It has particular application to an electrically powered railway or to road vehicles.

BACKGROUND

The concept of inductive coupling as a roadway power transmission system has been known for approximately 100 years, and there have been many attempts to develop the use of inductive coupling for the transportation of road vehicles. However, they have not proved to be sufficiently efficient and hence not commercially successful.

OBJECT

It is an object of this invention to provide an improved induction system capable of powering vehicles, or one which will at least provide the public with a useful choice.

STATEMENT OF THE INVENTION

In one aspect the invention comprises a power collector for collecting power from an inductive power transfer system across a space, using as its primary emitters of power as varying magnetic flux one or more primary conductors capable of carrying an alternating electric current having an operating frequency, the power collector comprising at least one capacitance and at least one coil of one or more windings for intercepting the magnetic field from the one or more primary conductors, and at least one electrical load, characterised in that the capacitance is in series with the coil and the load, and the reactance of the series capacitance is substantially equal to the inductive reactance of the coil at the operating frequency.

In a subsidiary aspect the windings of the coil of the power collector are made of solid conductive metallic material.

In a further subsidiary aspect the electrical load comprises a device capable of immediately consuming the alternating current developed within the windings of the coil.

In an alternative subsidiary aspect the electrical load comprises a device capable of using power from a storage battery connected to the power collector.

In a yet further subsidiary aspect the load comprises a device capable of using the alternating current after a first conversion into direct current and a second conversion into a voltage or current of a regulated amplitude.

In a more direct subsidiary aspect the load comprises a DC motor capable of providing a motive power .

In a second main aspect the invention comprises a primary conductor (for use with a power collector), comprising an elongated loop formed from one or more turns of an insulated conductive cable of a type having, for the conductive portion, a low ratio of external surface are to volume.

In a related aspect the conductive cable may optionally comprise a superconductive material of a type capable of exhibiting a very low ohmic resistance when cooled to below its superconducting temperature.

In another aspect the invention provides an inductive power transfer system in combination with a power collector as previously described, said system comprising a source of alternating electric power having an operating frequency; a resonant primary; a vehicle having at least one said power collector mounted thereon; wherein said power collector comprises at least one capacitance and at least one coil of one or more windings for intercepting the magnetic field from the one or more primary conductors, and at least one electrical load, characterized in that the capacitance is in series with the coil and the load, and the reactance of the series capacitance is substantially equal to the inductive reactance of the coil at the operating frequency.

In another aspect at least one metallic rail may be used as a primary conductor, upon which a substantially non-conductive vehicle may be supported by at least one non-conductive support incapable of conducting an electric current from the rail.

In a further aspect the operating frequency of the source of alternating power used in this system lies in the range of from 30 Hz to 1 MHz.

More preferably the operating frequency of the source of alternating power is that of a local mains supply frequency or an integer multiple of the supply frequency.

In a yet further related aspect there is more than one, electrically separated, elongated and looped primary conductor; each loop being contiguous at at least one end with an adjacent loop.

Alternatively one or more physically separated primary loops are located at designated positions.

In a further aspect, the invention may comprise a self-powered vehicle, adapted for use with an inductive power transfer system, comprising at least three road wheels and means for control and guidance, at least one power collector, apparatus for conversion of electrical energy into a storable form, apparatus for storage of electrical energy, and apparatus for recovery of stored electrical energy and its controlled delivery to at least one electromotive transducer.

Other subsidiary aspects will become apparent from the claims and the text of this specification.

DRAWINGS

These and other aspects of the invention, which should be considered in all its novel aspects, will become apparent from the following description, which is given by way of example only, with reference to the accompanying drawings, in which:

FIG. 6a illustrates a vehicle with on-board storage at a designated charging place.

FIG. 6b illustrates a preferred primary conductor loop.

FIG. 6c illustrates a superconducting primary conductor loop.

FIG. 7a illustrates a vehicle at a designated charging place, illustrating the relationship of the primary windings and the power collector.

FIG. 7b illustrates a section through a power collector.

EXAMPLE 1

Alternating current is supplied to a pair of parallel conductors (in this case a pair of electrically conductive rails 11). The frequency may vary from about 50 Hertz (50 Hz) to several MegaHertz (MHz) depending upon the size and nature of the track and trolley, and the relative economics of high frequency generation over frequencies related to mains frequencies.

Preferably the power is supplied at a frequency in the range of 2 KiloHertz (KHz) to 20 KHz. The prototype described in the preferred embodiment, and in the calculations, made use of a power supply of 10 KHz. The frequency and the current developed by the power supply may be selected, or varied, depending upon the size and nature of the rails, the size and nature of the pick-up coil, and the power requirements of the electric motor or motors on each trolley.

Figure 1:
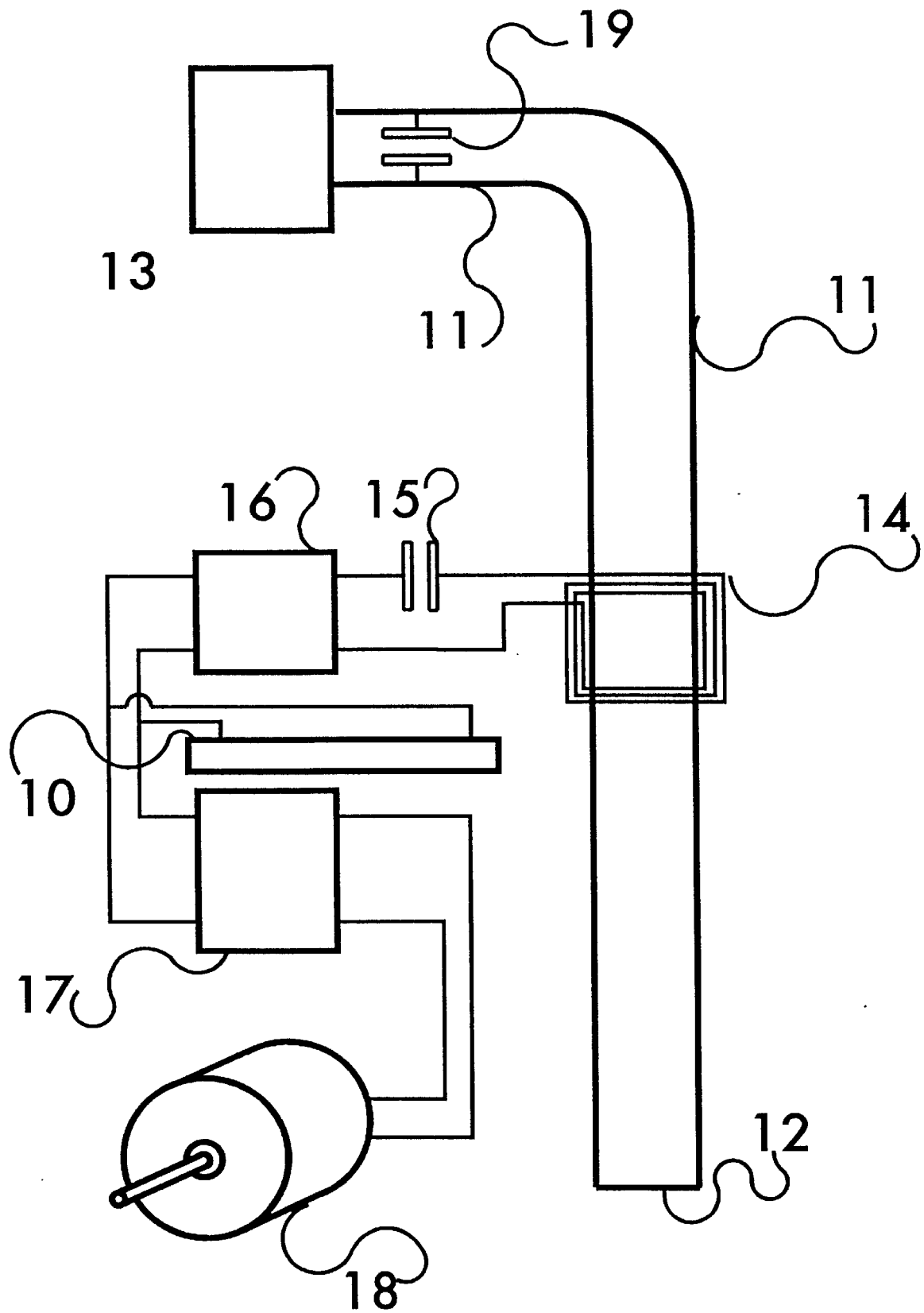
FIG. 1 is a schematic diagram of an inductively coupled railway with series capacitor.

The induction system of this invention is particularly suited to an electrical railway in which a pair of electrically conductive rails are used to support and guide one or more vehicles on the railway, and at the same time serve as a pair of parallel conductors for the alternating current supplied to the railway. These rails emit a varying magnetic flux which is the medium by which power is transferred to the power collector, more particularly to a secondary winding within it. These rails 11 are illustrated in FIG. 1. Referring to FIG. 1, the rails 11 are short-circuited at 12, and supplied by a power supply 13 providing alternating current. The pick-up coil 14 of a trolley is connected via a series capacitor 15 to a rectifier 16 and a DC—DC converter 17 to supply a brushless DC motor 18.

Figure 2A:
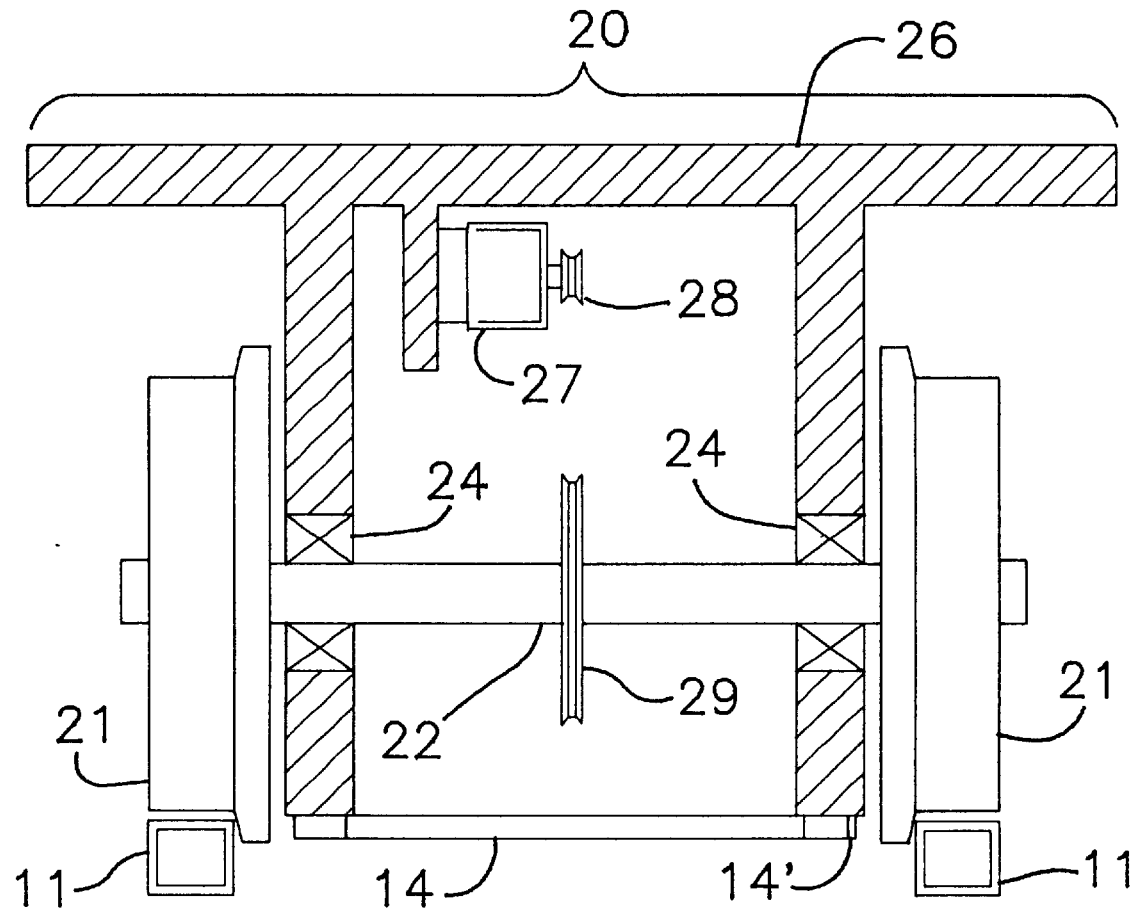
FIGS. 2a and 2b illustrate a cross-section through a pair of rails, and through an electrically powered trolley positioned on said rails.
Figure 2B:
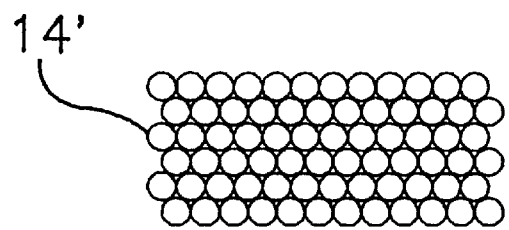

As shown in FIG. 2, it is preferred that the rails 1 1 are formed from a good electrical conductor such as aluminum, and this may be in the form of a solid or hollow section bar. In a prototype of this invention, the preferred rails comprise hollow aluminum rails, of outside dimensions of 30 mm×30 mm, having a central cavity, leaving a wall thickness of approximately 3 mm on either side This construction is suitable for lightweight trolleys or cars supported on the rail system In this prototype, the spacing of the rails is 600 mm. Such a rail spacing is suitable for carts of approximately 800 mm long×600 mm wide, as this dimension is relevant to the size of the coil which can be placed beneath the cart in close proximity to the rails.

As will become apparent from the calculations in the example, the size of the coil and the frequency of the alternating current supplied to the rails enables the prototype unit to provide approximately 400 watts to an electric motor situated on the trolley.

The rails are preferably supported on non-electrically conductive material, in order to avoid shorting out the rails, or the dissipation of the inductive power into metallic components close to the rail. For example, the rails may be directly attached to an inert substrate, or may be supported or separated by insulated sleepers such as timber, or plastic sleepers. In designing an inductively powered railway, it is preferred that the path of the railway is kept free of other metals, and in particular it is preferred that a space on either side of the rails, and above and below the rails equivalent to the rail spacing is substantially free of metal (other than the pick-up coil on the trolleys) in order to minimize inductive losses. As there is no direct electrical contact between the wheels and the rails, it is possible to coat the surface of the rails with an insulating or protective coating, such a coating may reduce transport noise in the system.

Alternatively, the wheels may be coated with, or made of, a plastics substance or another non-conductive material The trolley 20 shown in FIG. 2 preferably has a minimum of metal in close proximity to the powered rails, so that most of the power supplied by the rails is picked up by the coil 14 in close proximity to the rails, rather than by other metal components on the trolley. It is for this reason that the wheels 21 are preferably formed of a non-conductive material, such as a plastics material, although the axle 22 connecting the wheels may be a metal axle. As shown in FIG. 2, the pair of wheels of the trolley (of which there would normally be four wheels) are connected by a solid axle, typically a metal axle 22 supported on a pair of bearings 24. The wheels themselves will normally be formed of a hardwearing plastics material, although in the prototype trolley the wheels were machined from a high density particle board.

The deck 26 of the trolley is preferably formed of wood or plastics, or another nonconductive material, and an electric motor 27 is positioned underneath the tray, preferably as far away from the rails as possible, and towards the center of the tray, approximately equidistant from either rail. Any convenient form of electric motor may be used, although in the prototype system, we prefer to use a brushless DC motor, with variable speed control. The electric motor is preferably connected to the axle by means of a pair of pulleys 28, 29 connected by a belt (not shown).

The coil is preferably suspended beneath the trolley as close as possible to the rails although a clearance of 50–100 mm is acceptable. In the prototype a distance of 25 mm has been allowed between the outer edges of the coil and the adjacent rail. As shown in FIG. 2 the wheels are preferably flanged wheels, and as is typical with railway systems the flanges are provided on the inside of the rail. This has worked satisfactorily in the prototype trolley, although if a closer coupling between the coil and the rail is desired, then an alternative wheel configuration may be used, for example, the wheels may be reversed so that the flanges sit on the outside of the rails, allowing the coils to be placed very close to the rails without the flanges intervening between the coils and rails. Other wheel and rail designs are possible.

In the prototype, we have used a power supply capable of supplying an alternating current of 10 KHz, at 100 amperes. The supply circuit 13 (see FIG. 1) is preferably provided by means of a pulse width modulation integrated circuit such as a Texas Instruments TL494 chip.

The pick-up coil is approximately 600 mm wide and 800 mm long (corresponding as closely as possible to the overall dimensions of the trolley). In the prototype we have used a 50-turn coil of 1 mm copper wire resulting in an induced current of approximately 2 amps at 200 volts in the pick-up coil, providing approximately 400 watts to the motor.

In cross-section the prototype coil is approximately 8 mm wide and 10 mm deep, made up of 50×1 mm diameter insulated copper wires. This is shown as 14' in the expanded view in FIG. 2b.

The pick-up coil preferably forms part of a series resonant circuit, connected to a DC—DC converter to control the output from the coil so that it is suitable for driving a brushless DC motor. The DC—DC converter may be of the buck converter type In most cases the frequency of the power supply to the rails will be fixed, although if desired, a variable frequency source could be used, particularly if additional demands are made on the system, eg if more heavily-laden trolleys are used at some times rather than others.

The system allows for one or more trolleys to be powered by the rails, and if desired each trolley can be independently controlled, so that its speed and location can be controlled by controlling the brushless DC motor on each trolley. Intelligent controllers could be provided on each trolley to monitor the position of each trolley, and signals could be supplied via the rails to each trolley, and from each trolley to a central controller, if desired.

Figure 5:
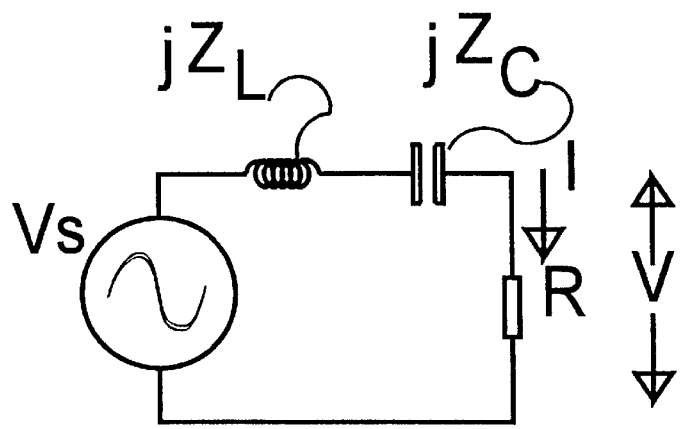
FIG. 5 illustrates a series resonant circuit for use in the coil of this invention.

The series resonant circuit of FIG. 5 is also shown schematically in FIG. 1, and is connected to a rectifier, and to a DC—DC converter to provide speed control to a brushless DC motor This brushless DC motor is preferably connected to an axle directly coupled to a pair of wheels, so that if a trolley has four wheels, two will be driven, and the other pair will be allowed to free-wheel.

In its preferred form the invention allows the pick-up coil to be of a size close to the overall size of the trolley, ie the trolley will preferably be rectangular in plan view, as will the coil. By using the rails as conductors, the coil can be close to the full width of the trolley. This construction has the advantage that no further wiring need be applied to the rail tracks.

Calculations for Example 1

In the following example reference is made to the parallel rail shown in FIG. 1, and to the schematic diagrams shown in FIG. 3, 4 and 5. In the following calculations reference will be made to a pair of rails (parallel conductors) at a spacing of 1 meter between them, for ease of demonstration.

Taking 2 parallel conductors at a spacing of 1 meter between them, then they have an inductance L=1.2 microhenries/meter.

Figure 3:
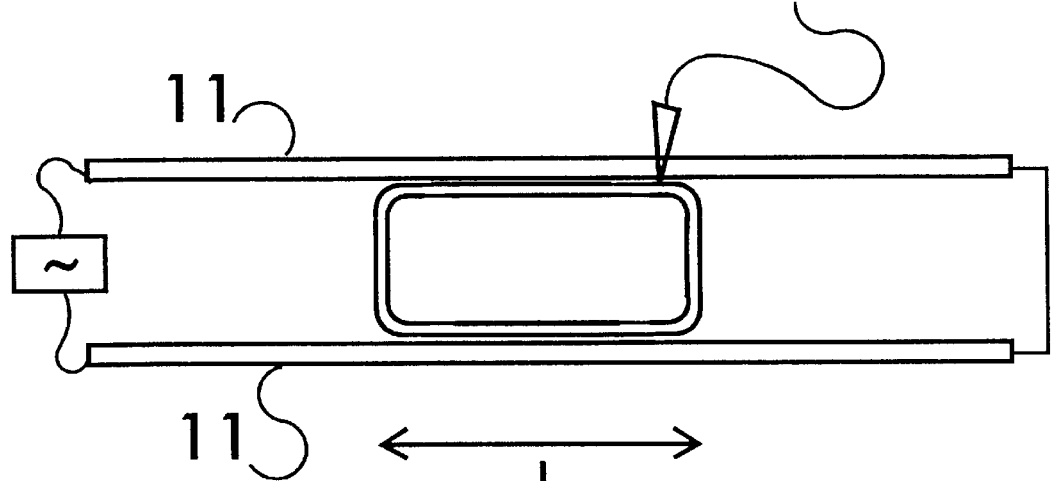
FIG. 3 is a top plan view of a coil positioned above said pair of rails.

If a rectangular coil of wire is placed close to the parallel wire, as in FIG. 3, a movable transformer is created where the stationery parallel wires are the primary winding and the secondary winding is the coil of wire of N turns, with length l meters.

Therefore the area of mutual inductance between the primary and secondary remains constant as the secondary is moved along the length of the primary winding.

For simplicity let N=1 and l=1 meter, then we have a secondary winding of 1.2 microhenries.

Now if the frequency of the supply is, say 10 KHz, and it is applied to one end of He primary winding and the other end shorted, then the following equations apply:

$Z_L j\pi \times 1.2 \times 10^{-6} \times l_p$, $Z_L$=impedance in ohms let $l_p$=10 meters $l_p$=length in meters $Z_L = j2\pi \times 10^4 \times 1.2 \times 10^{-6} \times 10$  $\omega = 2\pi f$ $Z_L = j0.754$ ohms f=10 KHz Now if a current of 100 amperes is passed through the primary section, then a voltage of 75.4 volts will occur across the input. This corresponds to 7.54 volts/meter and therefore by mutual inductance 7.54 volts will appear across the 1 turn secondary winding.

Figure 4:
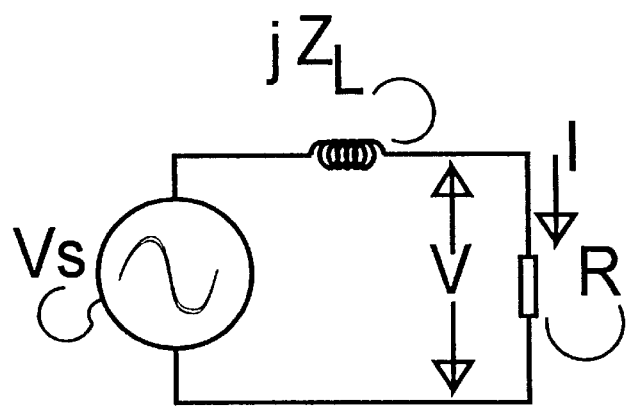
FIG. 4 illustrates a simple resonant circuit to illustrate the power pick-up in the coil of the vehicle.

Now if the secondary winding is loaded as shown in FIG. 4, the impedance will limit the output voltage and therefore output power as follows:

$V_S = I_S(R + jZ_L)$ to obtain maximum power transfer $R = Z_L$ (see FIG. 4).

$$\begin{aligned} \text{Power } P &= V \times I \\ &= \frac{V_S}{\sqrt{2}} \times \frac{V_S}{\sqrt{2} \times R} \\ &= 2r = V_S^2 \end{aligned}$$

To increase the power transfer a series resonant capacitor can be placed in the circuit as shown in FIG. 5.

If $jZ_L = -jZ_c$ then the output impedance will be zero but current limiting occurs due to the impedance of the remaining uncovered section of the primary.

Therefore by transformer action maximum current in the secondary will be 100 amperes (if 100% coupling occurs), Therefore maximum output power occurs when $R = jZ_L = -jZ_C$ and Power $P = \frac{V_S^2}{R}$ which is double the previous maximum output power possible without resonance.

In the example given then the maximum power $P = \frac{7.54^2}{0.0754} = 754$ watts The increase of resistance due to "skin effect" should also be taken into account. An aluminium conductor of 3 mm diameter will have a 10% increase in resistance at 10 KHz. Therefore care must be taken in calculating the actual resistance of conductors used. In one experiment, a 12 mm by 12 mm aluminium busbar was used as a combined rail and primary conductor for a powered rail system.

This gave a measured AC resistance of 14 milliohms for a 10 meter section and losses of 200 watts at a current of 100 amperes.

EXAMPLE 2

FIGS. 6a, 6b, 6c, 7a, 7b

This embodiment describes an inductive power transfer system 60 adapted for use with a vehicle, specifically a small (20-seats) bus 70 used for a short route up and down a shopping street. The vehicle or bus is planned to collect energy at charging stations 71 (usually identical to bus stops) along its route, where sources 62, 602, 76 of varying magnetic flux are provided, and store it for use as motive power between stops. This vehicle and its inductive supply systems are optimized for simplicity rather than absolute efficiency.

This bus has a conventional arrangement of steerable rubber-tired wheels at the front and a pair of driven rubber-tired wheels 74 at the rear. It may be advantageous to have all four wheels steerable, to better serve particular applications.

The bus covers a road area of 7 meters in length, and 24 meters in width. A power collector according to embodiments described earlier may be installed as a "skirt" around the perimeter of the bus (optionally curving up over wheel arches) and is provided as described in earlier embodiments with a series resonant capacitor of a size such that its reactance is substantially the same as the inductive reactance of the windings of the power collector. Alternatively the power collector may be inside the line of the wheels as shown by 77. The calculations included herein relate to this example and clearly may be varied for different conditions—such as using a 117 V AC, 60 Hz supply.

Calculations for Example 2

Power Collector:
Coil dimensions: 5 m length×2.4 m, rectangular.
Wire: 100 turns of 2.0 mm copper.

$$\begin{aligned}
\text{Coil res.} R_c &= 100 \times 15 \text{ m}/15 \times \pi \times 4 \\
&= 8 \text{ ohms} \\
\text{Coil inductance} &= 1.2 \times 10^4 \times 2.4 \times 5 \,\mu\text{H} \\
&= 144 \text{ mH (millihenries)} \\
\text{Coil impedance @ 50 Hz} &= 144 \times 50 \times 2 \times \pi \times 10^{-3} \text{ ohms} \\
&= 45 \text{ ohms} \\
\text{Series capacitance} &= 45 \text{ ohms} \\
\text{Coil Voltage} &= \text{turns ratio} \times \text{coupling ratio} \times 8 \text{ V/m} \times \text{length} \\
&= 100/9 \times 0.9 \times 8 \times 5 \\
&= 400 \text{ V AC}
\end{aligned}$$

(This voltage depends on the number of turns used and may be altered according to requirements.)

As the coil resistance is 8 ohms, then maximum power transfer occurs when $$\begin{aligned}
V_{out} &= 1/2 \, V_{open\ circuit} \\
I_{out} &= 200/8 = 25 \, A \\
P_{out} &= 25 \, A \times 400 \, V \\
&= 5 \text{ Kw} @ \eta = 50\%
\end{aligned}$$

Normally, to keep efficiency higher, the current may be limited to 10 A, whereupon the output power from the collector =400–(10×8)
=320 V AC
$P_{out}$=3.2 KW.

Primary Loop or Coil:
1000 A are provided in effect by a 9-turn primary loop, if the conductor current is 110 A.

$$\begin{aligned}
\text{Primary inductance } L &= 2.4 \times 1.2 \times 9^2 \,\mu\text{H/meter} \\
&= 233 \,\mu\text{H/meter} \\
\text{At 110 } A \text{ the voltage per meter } V &= 233 \times \omega \times 110 \, A \times 10^{-6} \\
\text{(where } \omega(\text{omega}) &= 2 \times \pi \times 50) \\
V &= 8 \text{ V/meter}
\end{aligned}$$

Therefore a 30 meter track could be run directly off a 240 V AC mains supply.

(30×8=240)

Power factor correction using a capacitor across the input to the loop reduces the 110 A of circulating current to about 10 A of supply current.

$$\begin{aligned}
Z_L &= 240/110 \\
&= 2.2 \text{ ohms} \\
Z_C &= Z_L = 1/\omega C \\
C &= 11/(\omega \times 2.2) \\
C &= 1450 \,\mu F \text{(microfarads)}.
\end{aligned}$$

Track losses ($I^2R$), assuming 95 mm² aluminium rod as the primary conductor, are:

$$\begin{aligned}
P_L &= 110^2 \times (9 \times 2)/(36 \times 95) \\
&= 64 \, W \text{ per meter or } 1920 \, W \text{ for a 30 meter track.}
\end{aligned}$$

Up to three 10 meter long buses could be charged at one time. For only one bus, the total losses are:
$P_L$=1.92 Kw+4 Kw Power out $P_O$=3.2 Kw
System efficiency $\eta\%$=3.2/4.92=65%

The storage device is a relatively small number of deep-discharge lead-acid storage batteries 63 (although any other type of storage battery may be used). The number of batteries preferred for any one vehicle is dependent on factors such as battery cost, durability (in terms of charge/discharge cycles) as against the feasible operating voltage, charging rate (and hence time), the distance between stops, battery weight and cost, and safety margins (such as a particular recharging stop being unavailable).

A suitable battery charger/battery monitor device is provided to rectify and optionally to change the voltage of the current from the power collector and charge the batteries whenever power is available, and to indicate the rate of charge and the state of charge. Such devices are well known in the art.

The preferred electromotive transducer is a type of brushless DC motor, preferably of an ironless construction such as a "CADAC" motor, preferably having an output of about 30 KW, and preferably a single motor is coupled to the drive shaft of a conventional differential gearbox such as a two-speed "Eaton" differential. Each motor has its own controller to energize windings in the correct order, and usually this is driven by a variable DC supply derived from the battery voltage in order to provide a variable motor torque or speed. Other types of motor may be preferred.

This vehicle design may have the usual features of electric motor drive such as regenerative braking, although the initial prototypes have deleted these features as the vehicle runs on a flat area in a not overly congested route.

Alternatively a motor (and its own controller) could separately drive each wheel, coupled through (for example) a planetary gearbox providing a geared-down ratio to the wheel hub. A further alternative is the use of multiple pairs of drive wheels, each pair having its own motor and differential. The low speed of the differential may be required for extra driving torque.

An option intended to reduce track losses is the use of superconducting materials to carry the large currents. Such an arrangement is illustrated in FIG. 6c, where 69 is an array of superconducting primary inductors 62c together with pipes for coolant 68 buried within insulation material 603 in a lined trench 602 under a roadway 601. Newly developed superconducting materials based on copper oxide and yttrium (for example) are capable of exhibiting superconductivity at commercially realisable temperatures— above the boiling point of liquid nitrogen.

Each designated charging position would comprise for example a conventional curbside bus stop 71. A shallow channel 67b cut in a rectangular form into the roadway at a position which is intended to lie substantially beneath the power collector 77 of the stopped bus 70 is filled with loops of the primary conductor; preferably in the form of single-conductor, underground cable of the type comprising a single 12 mm diameter aluminium rod sheathed with double insulation and approved in New Zealand for use at up to 400 V AC. This type of insulated conductive cable has a relatively low ratio of external surface area to volume for the conductive portion, in contrast to multiconductor cables. Preferably the length and number of turns are planned as outlined in the calculations above to provide a directly mains-connectable primary inductor, thereby discarding a transformer. 65 is the mains input supply in FIG. 6a, feeding through a controller 61 (including a power factor correction capacitor (as 19) and a contactor) and through wires 66 to the primary loops 62 (or 62b, or 76). In effect, the power factor correction capacitor renders the primary loop a parallel resonant circuit carrying a circulating current about ten times larger (in one installation) than the injected current. Alternative installations may use frequency-doubling techniques or otherwise raise the frequency of the primary alternating current, as the coupling is improved by the square of the operating frequency, but it is believed that the economic cost and costs in terms of reliability of such improvements are greater than using more turns of cable (now at NZ $2.50 per meter).

In order to minimize wasted power, the primary conductor is preferably energised only when the correct type of vehicle is over the primary conductors. Various indicators may be provided on the bus to indicate to the driver the best placement of the vehicle over the buried primary conductor—indicators such as a simple voltage or power meter, or external physical locators.

The ironless inductive power transfer system of the preferred embodiment works effectively with coil separation of the order of 100 mm (between 76 and 77 in FIG. 7*a*) and, given a relatively stiff suspension for the bus and no humps in the roadway along the routes travelled, there may not be any need to provide means to physically lower the power collector support 78 into closer proximity with the roadway concealing the primary conductors. However this option may bemused under other circumstances.

Iron (preferably as laminations) may be used in proximity to either or both the primary conductors and the power collector in order to improve coupling, although it is believed that this is not cost-effective over more turns of cable, and may introduce other problems such as magnetic attractive forces and magnetostrictive acoustic signals and vibrations, as well as corrosion problems.

In the present embodiment the only consumers are part of one organisation, but if multiple groups of consumers were to use the power some means to charge for the power taken may be required. In order to cater for that possibility, a microprocessor may be provided at each charging station to recognize a particular vehicle as one compatible with this system for inductive power transfer, to respond to a request for power, and then to energize the primary conductor (perhaps by closing a contactor) until such time as the vehicle moves off or signals that its batteries are charged. Vehicle recognition may be visual (using number-plate image identification) or by, means of radio or infrared signalling 73. Accounting may involve the use of a conventional telephone modem, a stored list of transactions read out directly at intervals, or a cellular telephone Alternatively charging positions may be widely dispersed in the road environment (such as near traffic lights, etc) and vehicles capable of using the power then carry their own metering facilities.

This embodiment has the advantages over conventional trolley buses that it has no need for overhead wiring, no unreliable pantograph or other current collectors to the wiring, and can wait indefinitely or go anywhere within reason between charging stops. At a charging stop it has the advantage that functional connection is made without any purposive act by the driver—e.g. to plug in a connector to a fixed post, wait, then remove it. This is useful from safety and anti-vandal aspects as well.

The magnetic field emitted by the primary conductors 62, 76 is approximately 25% of the WHO recommendation for 50 Hz magnetic field intensity for human body exposure, and in any case is produced only when a suitable vehicle actually overlies the conductors.

A prototype rubber-tired vehicle according to this embodiment, having a power collector with a pickup coil of dimensions 1.2×2.4 meters; 100 turns and no on-board storage was capable of moving one person while consuming approximately 30 W of induced power within a "CADAC" brushless DC motor geared down by 40:1, and was still capable of driving against an obstacle (with consequent loss of traction) while consuming 800 W of transferred power. The primary conductor loop comprised nine turns of cable as described previously, about 100 mm beneath the power collector coil, which was driven from an ordinary welding transformer fed from a 10A mains outlet with about 40 V AC, @50 Hz.

In a variation the overnight storage area, and/or the entire route or portions of it may also be provided with primary conductors and energizing means as described above.

VARIATIONS

Although in most applications the power will be directed to an electric motor, it will be appreciated that the trolley may be provided with light sources, heating elements, or other "consumers" of electric power.

Although the arrangement in FIG. 2 shows the coil mounted beneath the tray of the trolley, in-board of the rails, it will be apparent that an alternative allows the coil to be slightly wider than the rail spacing, with the coil situated on the outside perimeter of the trolley, at a height just above that of the rails, so that the coil extends across the outside front and rear of the trolley perimeter, and extends on the outside of the wheels, to provide an even closer coupling between the coil and the rails. Such an arrangement would approximate to the coil shown in FIG. 2, which is wider than the rail spacing.

Because of the importance of the skin effect at higher frequencies, the rails can be formed from hollow metal sections, or if more solid rails are required, the rails could be formed of composite materials with only the outside few millimeters being formed of aluminium or other conductive material.

Finally, it will be appreciated that various alterations or modifications may be made to the foregoing without departing from the scope of this invention as set forth in the following claims.

I claim:

1. An inductive power transfer system comprising:
a source of alternating electric power having an operating frequency;
a resonant primary for generating a magnetic field from said source of alternating current;
a vehicle having at least one inductive power collector mounted thereon;
wherein said inductive power collector comprises at least one capacitance and at least one coil of one or more windings for intercepting the magnetic field from said resonant primary, and at least one electrical load,
wherein the at least one capacitance is in series with the coil and the load, and the reactance of the series capacitance is substantially equal to the sum of (a) the inductive reactance of the coil at the operating frequency and (b) the mutual reactance of the coupling between the resonant primary and the at least one coil of the power collector, and
wherein there is no parallel resonance effect.

2. An inductive power transfer system as claimed in claim 1, wherein the coil of the power collector is spaced apart from the resonant primary by up to about 100 mm.

3. An inductive power transfer system as claimed in claim 2, wherein the operating frequency of the source of alternating power lies in the range of from 30 Hz to 1 MHz.

4. An inductive power transfer system as claimed in claim 3, wherein the operating frequency of the source of alternating power is that of a local supply frequency or an integer multiple of the supply frequency.

5. An inductive power transfer system as in claim 4, wherein said resonant primary comprises plural electrically separated, elongated primary conductor loops each of said loops being contiguous at at least one end with an adjacent one of said loops.

6. An inductive power transfer system as claimed in claim 1, wherein said resonant primary comprises one or more physically separated loops which are located at designated positions so that the power collector is energized when said vehicle is in physical proximity to any one of said loops.

7. An inductive power transfer system as claimed in claim 1, wherein the load comprises a device capable of using the alternating current after a first conversion into direct current and a second conversion into a voltage or current of a regulated amplitude.

8. An inductive power transfer system comprising:
   a source of alternating electric power having an operating frequency;
   a resonant primary having an elongated track comprising a pair of electrically conductive rails;
   a plurality of vehicles each vehicle capable of moving on said track and each vehicle having at least one inductive power collector mounted thereon;
   wherein each said inductive power collector comprises at least one capacitance and at least one coil of one or more windings for intercepting a magnetic field from the primary conductive rails, and at least one electrical load,
   wherein the at least one coil is spaced apart from the conductive rails by up to about 100 mm,
   wherein the at least one capacitance is in series with the coil and the load, and the reactance of the series capacitance is substantially equal to the sum of (a) the inductive reactance of the coil at the operating frequency and (b) the mutual reactance of the coupling between the resonant primary and the at least one coil of the power collector, and
   wherein there is no parallel resonance effect thereby allowing said vehicles to be adjacent to one another on said track without interfering with one another.

9. A self-powered vehicle, adapted for use with an inductive power transfer source producing a varying magnetic field at an operating frequency, said vehicle comprising:
   at least three road wheels and means for control and guidance,
   at least one inductive power collector for collecting power from said inductive power transfer system,
   apparatus for conversion of electrical energy into a storable form,
   apparatus for storage of electrical energy,
   apparatus for recovery of stored electrical energy and its controlled delivery to at least one electromotive transducer,
   the power collector comprising at least one capacitance and at least one coil of one or more windings for intercepting the magnetic field from the inductive power transfer source, and at least one electrical load,
   wherein the at least one capacitance is in series with the coil and the load, and the reactance of the series capacitance is substantially equal to the sum of (a) the inductive reactance of the coil at the operating frequency and (b) the mutual reactance of the coupling between the inductive power transfer source and the at least one coil of the power collector, and
   wherein there is no parallel resonance effect.

10. A power collector for collecting power from an inductive power transfer source across a space, using one or more primary conductors capable of carrying an alternating electric current having an operating frequency as primary emitters of a varying magnetic field, the power collector comprising at least one capacitance and at least one coil of one or more windings for intercepting the magnetic field from the one or more primary conductors, and at least one electrical load,
   wherein the at least one capacitance is in series with the coil and the load, and the reactance of the series capacitance is substantially equal to the inductive reactance of the coil at the operating frequency, and
   wherein there is no parallel resonance effect.

* * * * *